(No Model.)
F. S. McALISTER.
CASTER.
No. 465,192. Patented Dec. 15, 1891.
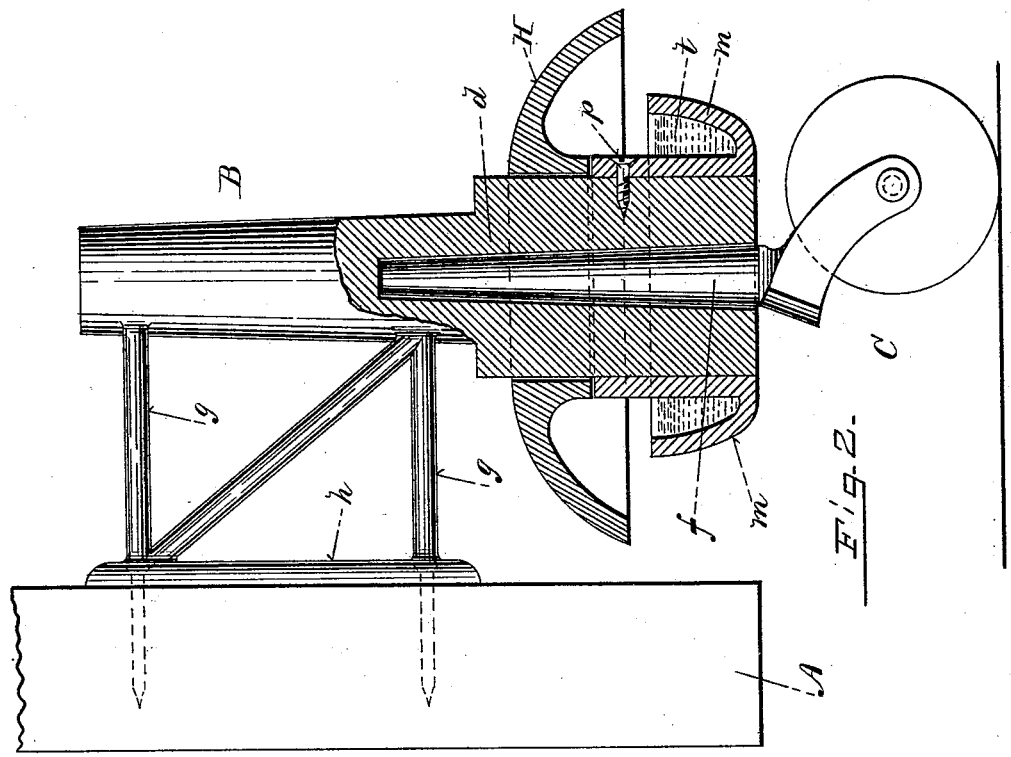
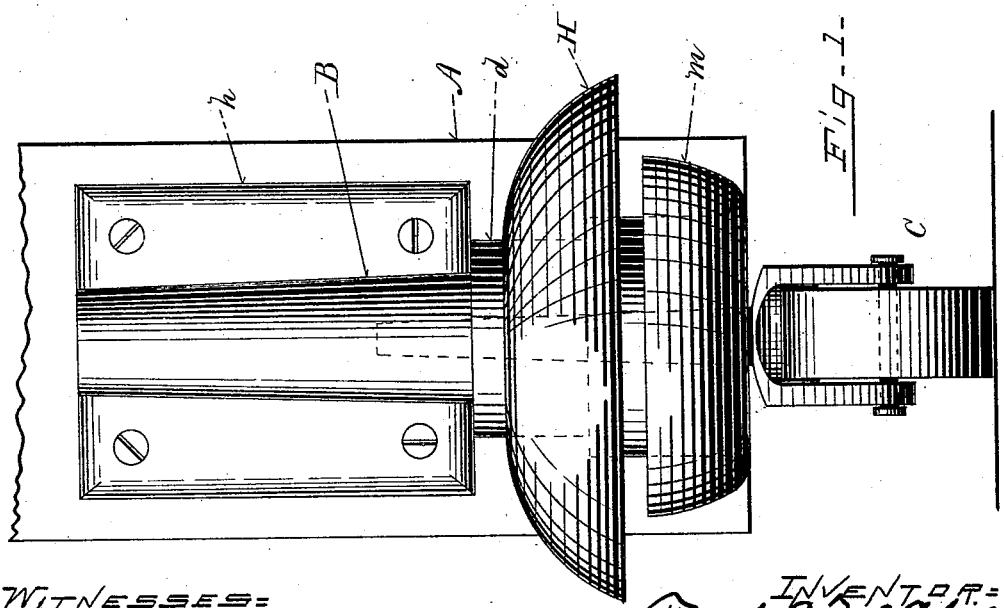
WITNESSES:
Irving H. Gay.
F. S. Dunning.
INVENTOR:
Frank S. McAlister
per C. A. Shaw & Co.
Atty's.

UNITED STATES PATENT OFFICE.

FRANK S. McALISTER, OF BOSTON, MASSACHUSETTS.

CASTER.

SPECIFICATION forming part of Letters Patent No. 465,192, dated December 15, 1891.

Application filed August 24, 1891. Serial No. 403,519. (No model.)

*To all whom it may concern:*

Be it known that I, FRANK S. MCALISTER, of Boston, in the county of Suffolk, State of Massachusetts, have invented certain new and useful Improvements in Insect-Traps for Beds, of which the following is a description sufficiently full, clear, and exact to enable any person skilled in the art or science to which said invention appertains to make and use the same, reference being had to the accompanying drawings, forming part of this specification, in which—

Figure 1 is a front elevation of a portion of a bedstead-leg, caster, and caster-bracket provided with my improvement; and Fig. 2, a side elevation of the same, a portion of the bracket and the trap being shown in vertical transverse section.

Like letters of reference indicate corresponding parts in both figures of the drawings.

My invention relates, especially, to a trap or guard for preventing insects from ascending the legs of bedsteads from the floor; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation:

In the drawings, A represents the bedstead-leg, B the caster-bracket considered as a whole, and C the caster, these parts being of any suitable form and construction. The form of bracket shown comprises a vertical body or socket portion $d$, which is circular in horizontal section and is adapted to receive the caster-spindle $f$, said body being supported by arms $g$, which project laterally from a face-plate $h$, secured to the leg A. On the body $d$, directly above the caster and encircling the same, there is an annular trough or cup $m$, secured in position on said body by a screw $p$. Loose on said body above the cup there is an overhanging hood H, the edges of which project beyond the trough $m$. Said hood is fitted to rotate and slide vertically on the socket-body $d$.

In the use of my improvement the hood H is pushed upward and the trough $m$ filled with liquid $t$, preferably a poison compound. The insects in crawling up the caster pass onto the outer face of the trough. The distance between said trough and the hood edge is too great for the insect to pass over, and its course within the trough is stopped by the poisonous liquid $t$, which either kills the insect or causes it to retreat.

The hood H may be omitted, if desired, without impairing the utility of the device; but I prefer to employ the same, as it acts as a shield for the liquid.

Having thus explained my invention, what I claim is—

A caster for a bedstead, comprising a socket provided with a bracket for attachment to a bedstead or other article of furniture, a caster-spindle adapted to swivel in said socket and provided with a caster-wheel, an annular trough attached to said socket, and an annular hood adapted to slide loosely on said socket above said trough, substantially as described.

FRANK S. McALISTER.

Witnesses:
K. DURFEE,
O. M. SHAW.